(12) United States Patent
Popp et al.

(10) Patent No.: US 12,641,587 B2
(45) Date of Patent: May 26, 2026

(54) SIGNALING FOR POWER CLASS FALLBACK WITH TRANSMISSION DIVERSITY

(71) Applicant: Apple Inc., Cupertino, CA (US)

(72) Inventors: Daniel Popp, Munich (DE); Fucheng Wang, Cupertino, CA (US); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 609 days.

(21) Appl. No.: 18/079,190

(22) Filed: Dec. 12, 2022

(65) Prior Publication Data

US 2023/0345446 A1 Oct. 26, 2023

Related U.S. Application Data

(60) Provisional application No. 63/333,769, filed on Apr. 22, 2022.

(51) Int. Cl.
*H04W 72/21* (2023.01)
*H04W 28/02* (2009.01)
(Continued)

(52) U.S. Cl.
CPC ... *H04W 72/0473* (2013.01); *H04W 28/0215* (2013.01); *H04W 52/365* (2013.01); *H04W 72/21* (2023.01)

(58) Field of Classification Search
None
See application file for complete search history.

(56) References Cited

U.S. PATENT DOCUMENTS 8,555,391 B1 * 10/2013 Demir .................... G06F 21/56
713/188
11,212,760 B2 * 12/2021 Xu ........................ H04W 72/23
(Continued)

FOREIGN PATENT DOCUMENTS

WO WO-2011140149 A2 * 11/2011 ........... H04B 7/0628

OTHER PUBLICATIONS

Ericsson, "More on transparent TxD and a Draft Reply LS to RAN2," TSG-RAN Working Group 4 (Radio) meeting #99-2, Electronic Meeting, R4-2109974, May 19-27, 2021.
(Continued)

*Primary Examiner* — Kodzovi Acolatse
(74) *Attorney, Agent, or Firm* — FLETCHER YODER PC

(57) ABSTRACT

Embodiments herein enable user equipment to indicate that it may operate in a transmission diversity mode, but may fall back to a single transmission mode for a lower power class. In particular, if the user equipment will not fall back to a single transmission mode for a lower power class, then the base station configures uplink resources for the user equipment based on the user equipment operating in the transmission diversity mode. Otherwise, the user equipment sends an indication to the base station that it will use the single transmission mode for the lower power class. The base station then configures uplink resources for the user equipment based on the user equipment operating in the transmission diversity mode for the higher power class, and configures the uplink resources for the user equipment based on the user equipment operating in the single transmission mode for the lower power class.

20 Claims, 7 Drawing Sheets

(51) Int. Cl.
    *H04W 52/36*     (2009.01)
    *H04W 72/044*     (2023.01)

(56)          References Cited

U.S. PATENT DOCUMENTS

| | | | | |
|---|---|---|---|---|
| 11,950,271 | B1* | 4/2024 | Marupaduga | H04W 24/08 |
| 2008/0146163 | A1* | 6/2008 | Korneluk | H04B 7/0874 |
| | | | | 455/73 |
| 2010/0074210 | A1* | 3/2010 | Gaal | H04J 13/00 |
| | | | | 370/329 |
| 2010/0142636 | A1* | 6/2010 | Heath, Jr. | H04W 72/23 |
| | | | | 375/260 |
| 2012/0008510 | A1* | 1/2012 | Cai | H04W 52/42 |
| | | | | 370/252 |
| 2012/0207045 | A1* | 8/2012 | Pelletier | H04W 72/0446 |
| | | | | 370/335 |
| 2013/0225094 | A1* | 8/2013 | Mujtaba | H04W 52/0245 |
| | | | | 455/73 |
| 2014/0135056 | A1* | 5/2014 | Wang | H04W 52/0212 |
| | | | | 455/574 |
| 2014/0205042 | A1* | 7/2014 | Kludt | H04B 7/0693 |
| | | | | 375/299 |
| 2018/0262905 | A1* | 9/2018 | Dhanapal | H04W 8/24 |
| 2019/0036582 | A1* | 1/2019 | Park | H04B 7/068 |
| 2019/0110256 | A1* | 4/2019 | Immonen | H04L 1/0025 |
| 2019/0357033 | A1* | 11/2019 | Cheng | H04W 16/02 |
| 2020/0008156 | A1* | 1/2020 | Yin | H04L 1/1858 |
| 2020/0170038 | A1* | 5/2020 | Park | H04J 11/0053 |
| 2021/0211169 | A1* | 7/2021 | Xue | H04W 16/28 |
| 2024/0196343 | A1* | 6/2024 | Das | H04W 52/42 |
| 2024/0322436 | A1* | 9/2024 | Yun | H05K 1/0243 |
| 2025/0056210 | A1* | 2/2025 | Zhang | H04W 8/24 |

OTHER PUBLICATIONS

Samsung, "Further Discussion on the Support of Transparent Tx Diversity in Rel-16," 3GPP TSG-RAN WG4 Meeting #97-e, Electronic Meeting, R4-2014849, Nov. 2-13, 2020.

* cited by examiner

SIGNALING FOR POWER CLASS FALLBACK WITH TRANSMISSION DIVERSITY

CROSS-REFERENCE TO RELATED APPLICATIONS

This application claims priority to U.S. Provisional Application No. 63/333,769, filed Apr. 22, 2022, entitled "SIGNALING FOR POWER CLASS FALLBACK WITH TRANSMISSION DIVERSITY," the disclosure of which is incorporated by reference herein in its entirety for all purposes.

BACKGROUND

The present disclosure relates generally to wireless communication, and more specifically to managing transmission power for wireless communication.

User equipment (e.g., a mobile communication device) may include one or more transmitters coupled to one or more antennas to enable the electronic device to transmit wireless signals. Some user equipment may include multiple transmitters, and transmit a signal using a single transmitter (e.g., in a single transmission mode) using one or more antennas, or transmit a signal using multiple transmitters using multiple antennas (e.g., in a transmission diversity mode). As using multiple transmitters may increase transmission power, it may be advantageous for the user equipment to operate in the transmission diversity mode when the user equipment is assigned a higher power class by a base station. Because using multiple transmitters has its drawbacks, such as increased power or current consumption, decreased maximum power capability due to increased emissions and/or specification requirements, increased power sensitivity when an antenna is blocked, possible signal cancellation due to transmitting multiple instances of the same signal, and so on, in some cases, such as when the base station assigns a lower power class to the user equipment, it may be advantageous for the user equipment to operate in the single transmission mode. However, the base station may be unaware of when the user equipment is operating in the transmission diversity mode and the single transmission mode. Because the base station may allocate different resources based on the user equipment's mode of operation, this may result in resource inefficiencies and poorer communication quality.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes causing, by processing circuitry of user equipment, a transmitter of the user equipment to transmit an indication of a capability of operating in a transmission diversity mode of the user equipment for a first power class to a base station. The method also includes causing, by the processing circuitry, the transmitter to transmit an indication of operating in a single transmission mode for a second power class to the base station, and causing, by the processing circuitry, a receiver of the user equipment to receive uplink resources from the base station based on the transmitter operating in the single transmission mode for the second power class. The method further includes causing, by the processing circuitry, the transmitter to operate in the single transmission mode using the uplink resources.

In another embodiment, a base station includes a transmitter, a receiver, and processing circuitry. The processing circuitry causes the transmitter to transmit system information comprising at least one frequency band, and causes the receiver to receive an indication that the user equipment will use single transmission for a first power class on the frequency band from user equipment. The processing circuitry also configures the user equipment with uplink resources based on the user equipment using single transmission for the first power class on the frequency band, or configures the user equipment with uplink resources based on the user equipment using transmission diversity for a second power class on the frequency band.

In yet another embodiment, one or more tangible, non-transitory, computer-readable media, stores instructions that cause processing circuitry of user equipment to cause a transmitter of the user equipment to transmit an indication of a threshold power headroom associated with transitioning between operating in a single transmission mode and operating in a transmission diversity mode to a base station. The instructions also cause the processing circuitry to cause the transmitter to transmit an indication of a power headroom of the transmitter to the base station, and cause a receiver of the user equipment to receive an indication of uplink resources allocated by the base station based on the power headroom of the transmitter and whether the user equipment operates in the single transmission mode or the transmission diversity mode. The instructions further cause the processing circuitry to cause the transmitter to operate in the single transmission mode or the transmission diversity mode based on the power headroom.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
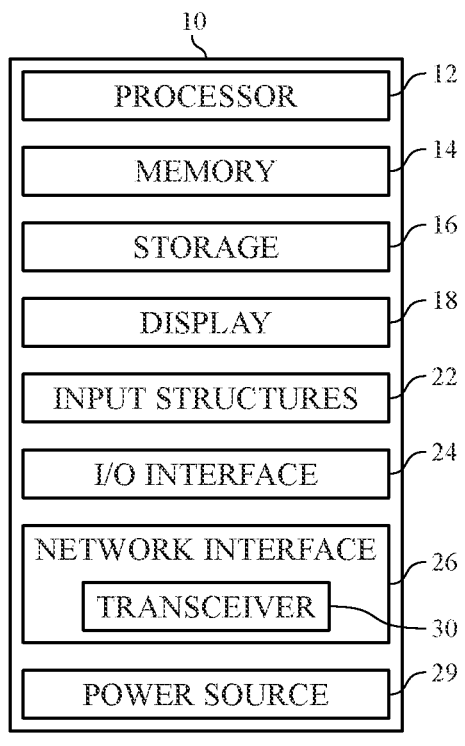
FIG. 1 is a block diagram of user equipment, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

This disclosure is directed to managing transmission power for wireless communication. As discussed above, user equipment (e.g., a mobile communication device) may transmit a signal using a single transmitter (e.g., in a single transmission mode) using one or more antennas, or transmit a signal using multiple transmitters using multiple antennas (e.g., in a transmission diversity mode). As using multiple transmitters may increase transmission power, it may be advantageous for the user equipment to operate in the transmission diversity mode when the user equipment is assigned a higher power class by a base station. Because using multiple transmitters has its drawbacks, such as increased power or current consumption, increased power or current consumption, decreased maximum power capability due to increased emissions and/or specification requirements, increased power sensitivity when an antenna is blocked, possible signal cancellation due to transmitting multiple instances of the same signal, and so on, in some cases, such as when the base station assigns a lower power class to the user equipment, it may be advantageous for the user equipment to operate in the single transmission mode. However, the base station may be unaware of when the user equipment is operating in the transmission diversity mode and the single transmission mode. Because the base station may allocate different resources based on the user equipment's mode of operation, this may result in resource inefficiencies and poorer communication quality.

Embodiments herein provide various apparatuses and techniques to enable user equipment to indicate that it may operate in a transmission diversity mode, but may fall back to a single transmission mode for a lower power class. In particular, the user equipment detects a cell or coverage area supported by a base station and synchronizes to the cell, the base station broadcasts system information, and the user equipment receives the system information. The user equipment then sends an indication of its capabilities (e.g., transmission and/or reception capabilities), which includes that the user equipment is capable of transmission diversity, to the base station. If the user equipment will not fall back to a single transmission mode for a lower power class, then the base station configures uplink resources for the user equipment based on the user equipment operating in the transmission diversity mode (e.g., for both the lower power class and a high power class). If the user equipment will fall back to the single transmission mode for the lower power class, then the user equipment sends an indication to the base station that it will use the single transmission mode for the lower power class. The indication may be in the form of setting a bit in a modified maximum power reduction (MPR) field, or other type of signaling. The base station then configures uplink resources for the user equipment based on the user equipment operating in the transmission diversity mode for the higher power class, and configures the uplink resources for the user equipment based on the user equipment operating in the single transmission mode for the lower power class.

In some embodiments, since the user equipment regularly sends a power headroom report (PHR) to the base station, transitioning between the transmission diversity mode and the single transmission mode may be based on the PHR. That is, the user equipment sends an indication of a threshold for which the user equipment transitions between the transmission diversity mode and the single transmission mode. The user equipment then sends the PHR to the base station. At the user equipment, if the PHR is greater than the threshold, the user equipment operates in the single transmission mode, and if the PHR is less than or equal to the threshold, the user equipment operates in the transmission diversity mode. At the base station, if the PHR is greater than the threshold, the base station configures uplink resource for the user equipment based on the single transmission mode, and if the PHR is less than or equal to the threshold, the base station configures uplink resource for the user equipment based on the transmission diversity mode.

In additional or alternative embodiments, rather than a threshold for which the user equipment transitions between the transmission diversity mode and the single transmission mode, there may be a buffer around the threshold so that the user equipment avoids constantly switching between the two modes if the PHR floats near the threshold. As such, there may be a higher threshold range for which the user equipment operates in the single transmission mode and a lower threshold range for which the user equipment operates in the transmission diversity mode. If the PHR falls in between the two ranges, then the user equipment continues operating in its current mode (e.g., the single transmission mode or the transmission diversity mode), and the base station maintains a current uplink resource configuration for the user equipment (e.g., based on the single transmission mode or the transmission diversity mode).

FIG. 1 is a block diagram of user equipment 10 (e.g., an electronic device, a wireless communication device, a mobile communication device, and so on), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the non-volatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mm-Wave) frequency range (e.g., 24.25-300 gigahertz (GHz))

that defines and/or enables frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
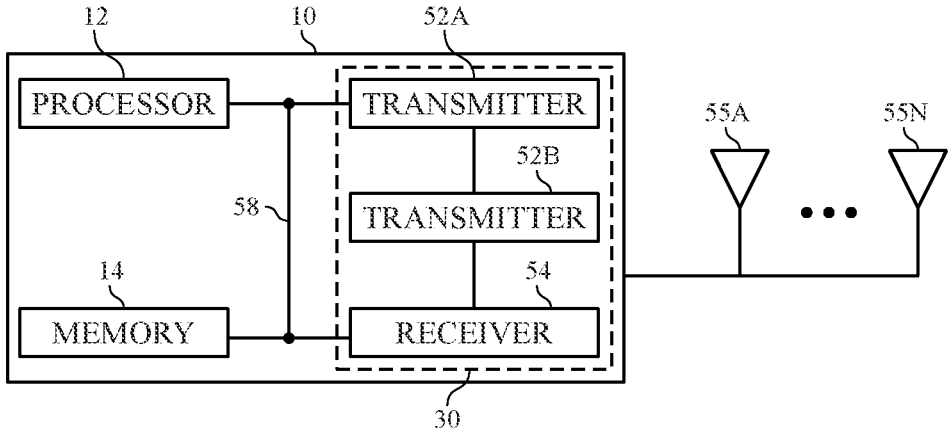
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, first and second transmitters 52A and 52B (collectively 52), a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitters 52 and/or the receiver 54 that respectively enable transmission and reception of data between the user equipment 10 and an external device via, for example, a network (e.g., including base stations or access points) or a direct connection. As illustrated, the transmitters 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam.

The user equipment 10 may transmit a signal using a single transmitter (e.g., 52A or 52B) via the one or more antennas 55 when operating in a single transmitter (TX) mode, or transmit the signal using multiple or both transmitters 52A and 52B, each transmitter 52A, 52B using a respective set (e.g., one or more) of antennas 55, when operating in a transmission diversity mode. Advantageously, using the multiple transmitters 52A, 52B may increase transmission power of the signal, though doing so may draw more power and/or current, increased power or current consumption, decreased maximum power capability due to increased emissions and/or specification requirements, increased power sensitivity when an antenna 55 is blocked, possible signal cancellation due to transmitting multiple instances of the same signal, and so on. The user equipment 10 may include more transmitters, multiple receivers, multiple transceivers, and/or multiple antennas as suitable for various communication standards. In some embodiments, the transmitters 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
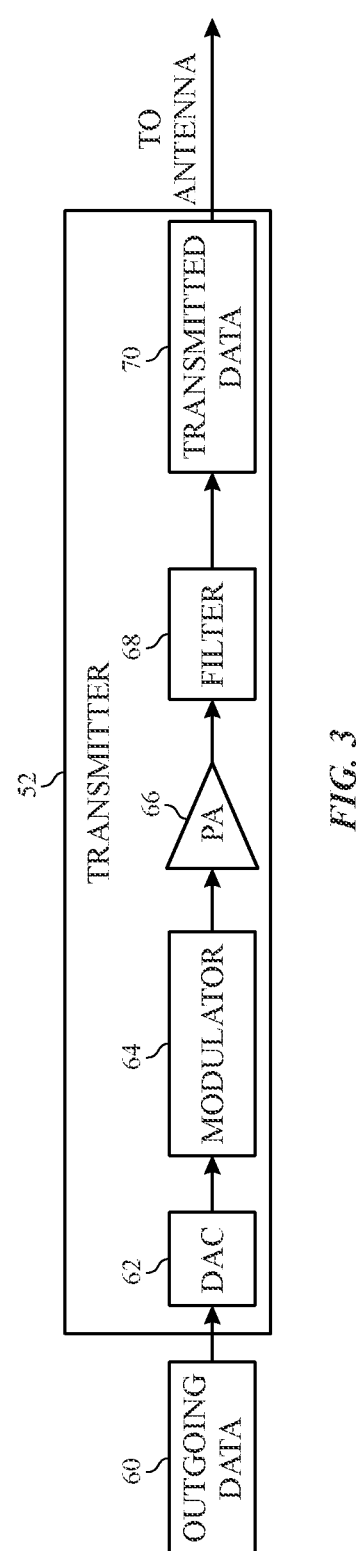
FIG. 3 is a schematic diagram of a transmitter of the user equipment of FIG. 1, according to embodiments of the present disclosure.

FIG. 3 is a schematic diagram of a transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted data 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
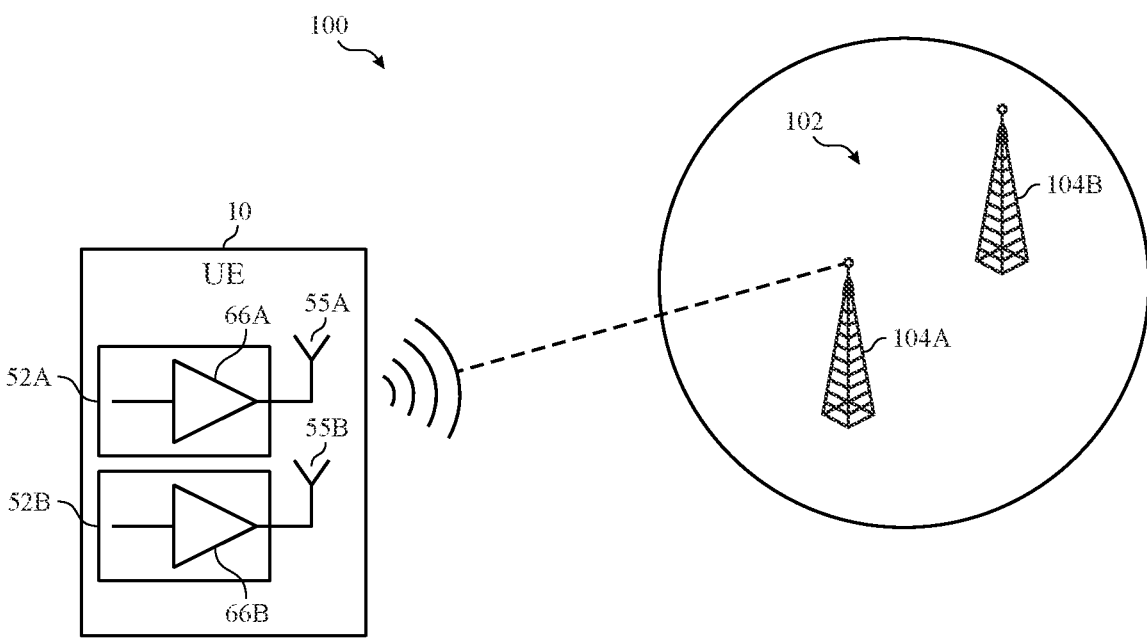
FIG. 4 is a schematic diagram of a communication system including the user equipment of FIG. 1 communicatively coupled to a wireless communication network supported by base stations, according to embodiments of the present disclosure.

FIG. 4 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, a memory 14, a storage 16, a transceiver 30, a transmitter 52, a receiver 54, and associated circuitry shown in FIG. 3. It should be understood that while the present disclosure may use 5G/NR as an example specification or standard, the embodiments disclosed herein may apply to other suitable specifications or standards (e.g., such as the 4G/LTE specification, or 6G or beyond). Moreover, the network 102 may include any suitable number of base stations 104 (e.g., one or more base stations 104, four or more base stations 104, ten or more base stations 104, and so on).

As mentioned, the user equipment 10 may perform transmission diversity by using at least the two transmitters 52A, 52B (illustrated as each having a respective power amplifier 66A, 66B) over multiple antennas 55 when the network 102 configures the user equipment 10 for single port transmission (e.g., transmission using a single transmitter 52, a single antenna 55, or a single set of antennas 55). It should be noted that the antenna 55A may include a first set of antennas 55 (e.g., one or more antennas) which may or may not be used to send a radio frequency signal via beam-forming, and the antenna 55B may include a second set of antennas 55 (e.g., one or more antennas) which may or may not be used to send a radio frequency signal via beam-forming. While the network 102 may configures the user equipment 10, for single port transmission, the user equipment may nevertheless perform transmission diversity using multiple transmitters 52 and multiple antennas 55, as transmission diversity may be performed "transparently" with respect to the network 102, such that the network 102 may not be aware of the user equipment 10 performing transmission diversity. Because uplink performance of the user equipment 10 may degrade when performing transmission diversity (e.g., due to signal cancellation from the two transmitters 52A, 52B sending the same signal), the user equipment 10 may indicate to the network 102 that it is capable of performing transmission diversity. For the 3GPP specification, the user equipment 10 may indicate that it is capable of performing transmission diversity using BandNR parameters of Technical Specification (TS) 38.306, though this is not mandatory per frequency band capability, and may only apply to when the user equipment 10 is allocated a channel in Frequency Range 1 (which includes sub-6 gigahertz (GHz) frequency bands).

Certain power classes specified by the 3GPP may require transmission diversity for single port transmission. A power class may define a maximum transmission power over a channel bandwidth. For example, power class (PC) 1.5 (PC1.5) is defined by the 3GPP for dual transmission use and requires transmission diversity for single port transmission. As previously mentioned, while transmission diversity performed by multiple transmitters 52A, 52B enables greater transmission power than may be achieved with only one of the transmitters (52A or 52B), there are uplink performance costs associated with performing transmission diversity compared to single transmission.

First, maximum power capability may be decreased (e.g., it may be less than simply adding a transmission power of the first transmitter 52A and a transmission power of the second transmitter 52B) because of increased emissions from the transmitters 52A, 52B. That is, the transmission powers of each transmitter 52A, 52B may be decreased to decrease power of intermodulation products caused by the single transmitted by each transmitter 52A, 52B. Moreover, a difference in adjacent channel leakage ratio (ACLR) requirements, compared to power class 3 (PC3) or power class 2 (PC2), may also result in a decrease in maximum power capability of the transmitters 52A, 52B. Second, user equipment 10 performing transmission diversity may experience significant power change if a transmit antenna 55 is blocked. In contrast, when single transmission is used, if an antenna 55 is blocked, the user equipment 10 may simply switch to another antenna 55. However, since transmission diversity uses multiple antennas 55A, 55B, this may not be an option. Furthermore, a phase relation between both transmissions of the same signal may cause signal cancellation at the base station 104, particularly in a loss of signal scenario. While delay diversity schemes (e.g., where one transmission of the signal may be delayed when compared to the other transmission) may introduce some degree of decorrelation, effective implementation may be limited due to certain constraints. For example, cyclic delay diversity with significant timing advance may be performed to decorrelate the transmissions, but this may result in performance loss (e.g., delayed signal reception or processing), which may negatively affect user experience.

The 3GPP Technical Specification Group (TSG) Radio Access Network (RAN) Work Group (WG) 4 (RAN4) agreed that user equipment 10 supporting two transmitters 52 each supporting a power amplifier 66 capable of outputting a maximum transmission power of 23 decibel-milliwatts (dBm) for PC2, or two transmitters 52 each supporting a power amplifier 66 capable of outputting a maximum transmission power of 26 dBm for PC1.5 may report a capability of performing transmission diversity to the network 102. The network 102 may assume that the user equipment is using two half-power power amplifiers 66. That is, in the case of user equipment 10 signaling PC2, the network may assume that the user equipment 10 has two PC3 power amplifiers 66. Additionally, the disclosed embodiments may also apply to mixed architectures, where the two power amplifiers 66 have different maximum transmission powers (e.g., one power amplifier 66 having a maximum transmission power of 23 dBm, another power amplifier 66 having a maximum transmission power of 26 dBm). In such a case, for one component carrier without configuration for 2-layer uplink multiple-input and multiple-output (MIMO), if the user equipment 10 indicates transmission diversity, then a base station 104 may indicate that a maximum power reduction (MPR) associated with transmission diversity applies. Otherwise, base station 104 may indicate that an MPR associated with single transmission applies. For one component carrier with configuration for 2-layer uplink MIMIO, the base station 104 may indicate that an MPR associated with transmission diversity applies, regardless of the transmission diversity indication transmitted by the user equipment 10.

The user equipment 10 may indicate a supported PC to the base station 104 and/or the network 102 that enables higher maximum transmission power than a default power class. For instance, a default power class may include PC3, and the user equipment 10 may indicate that it supports higher power classes, such as PC2 or PC1.5. Under certain circumstances, the user equipment 10 may apply a different (e.g., lower) PC than indicated to the network 102. For example, the power amplifiers 66A, 66B of the user equipment 10 shown in FIG. 4 may each be capable of a maximum transmission power of 23 dBm, and, when performing transmission diversity (e.g., by operating both power amplifiers 66A, 66B to each amplify the same signal), may enable the user equipment 10 to output a maximum transmission power of 26 dBm. As such, the user equipment 10 may indicate that it supports PC2 (which has a maximum transmission power of 26 dBm). In response, the base station 104 may transmit an indication of a maximum transmission power (Pmax) of 23 dBm. As such, the user equipment 10 may have to apply the lower power requirements of PC3 (which has a maximum transmission power of 23 dBm) to meet the Pmax.

In such a case, where the base station 104 and/or the network 102 indicate a Pmax that causes the user equipment 10 to apply requirements of a different (e.g., lower) PC, the user equipment 10 that has indicated the capability of performing transmission diversity may use both power amplifiers 66A, 66B by performing transmission diversity while it applies the lower PC, or use one power amplifier (e.g., 66A) while deactivating, turning off, or stop supplying power to the other power amplifier (e.g., 66B) while it applies the lower PC.

In the case where the user equipment 10 uses one power amplifier 66A while deactivating the other 66B, it may be advantageous to inform the network 102 since the indication of transmission diversity may affect scheduling and uplink configuration of the user equipment 10 by the network 102. In particular, due to the generally decreased uplink performance when performing transmission diversity, the network 102 may configure the user equipment 10 with inferior uplink operating parameters or characteristics, such as lower modulation order, smaller allocated resource blocks, and so on, compared to if the network 102 configured the user equipment 10 for single transmission, which may degrade throughput and user experience. However, the network 102 may not simply assume that the user equipment 10 is not performing transmission diversity, as it is a transparent feature (e.g., transparent to the network 102 such that the user equipment 10 may turn it on or off without the network 102 having knowledge of it) that is controlled by the user equipment 10. Moreover, the current 3GPP specification does not enable the user equipment 10 to inform the network 102 that it may not apply transmission diversity if it has indicated its capability to perform transmission diversity (e.g., for a supported PC).

Accordingly, the embodiments disclosed herein enable the user equipment 10 to indicate that it is capable of performing transmission diversity at a higher power class, and that it may perform single transmission when falling back to a lower power class. That is, when the user equipment 10 indicates that it supports transmission diversity for a higher power class, it may continue using transmission diversity or switch to single transmission configured to use the lower power class without informing the network 102, the user equipment's 10 mode of operation with respect to transmission diversity is transparent to the network 102. In some cases, the user equipment 10 may indicate a maximum power reduction (MPR) that it may use for a power class, which may be different for each transmission mode. For example, in the case where the user equipment 10 indicates that it supports transmission diversity for PC1.5, and the network 102 applies the lower PC2 power class to the user equipment 10, the user equipment 10 may indicate that it may use a standard PC2 MPR and not a transmission diversity MPR for PC2.

However, if the user equipment 10 does not inform the network 102 that it is switching to single transmission, then the network 102 may allocate inferior uplink resources due to the decreased uplink performance associated with performing transmission diversity, as it may assume that the user equipment 10 is operating using transmission diversity. Instead, the disclosed embodiments enable the user equipment 10 to indicate that, when falling back to the lower power class, it may use single transmission instead of transmission diversity.

In some embodiments, a modified maximum power reduction (MPR) field as specified by the 3GPP (e.g., modifiedMPR-Behavior) may be leveraged to indicate that the user equipment 10 may use single transmission when falling back to a lower power class. The modified MPR field may be particularly applicable, as MPR may change between power classes. For example, the user equipment 10 may set a modifiedMPR-Behavior bit or value associated with transmission diversity to a predefined value (e.g., a high value or '1') to indicate to the network 102 that the user equipment 10 may or will use single transmission in the case of applying a lower power class. The modified MPR field may be defined per frequency band, and may be defined for each time-division duplex (TDD) frequency bands of multiple TDD frequency bands.

In additional or alternative embodiments, any suitable form of signaling (e.g., a new form of signaling that is not currently adopted by the 3GPP) may be used that indicates that the user equipment 10 may use single transmission when falling back to a lower power class. The signaling may be applicable for each frequency bands of multiple frequency bands and/or may enable changing MPR (e.g., from a PC1.5 MPR to a PC2 MPR). That is, as with embodiments using the modified MPR field to indicate that the user equipment 10 may use single transmission when falling back to a lower power class, the signaling may enable the user equipment 10 to indicate MPR parameters (e.g., using the standard PC2 MPR instead of the transmission diversity PC2 MPR as defined by the 3GPP, or vice versa), and the base station 104 and/or the network 102 may schedule and/or configure the user equipment 10 based on the indicated MPR. For example, the base station 104 and/or the network 102 may schedule and/or configure the user equipment 10 with increased performance based on a greater MPR (e.g., compared to a lower MPR).

By indicating that the user equipment 10 may use single transmission when falling back to a lower power class, the base station 104 and/or the network 102 may schedule and/or configure the user equipment 10 based on the single transmission operating mode when applying the lower power class. For example, the base station 104 and/or the network 102 may assign greater or superior uplink resources, such as higher modulation order, increased signal power, more resource blocks, and so on, to the user equipment 10 performing single transmission compared to when performing transmission diversity. In some embodiments, the base station 104 and/or the network 102 may determine (e.g., using a receiver 54) if a transmission signal quality or power of the user equipment 10 is below a threshold and/or if there is an indication that the user equipment 10 is near a cell edge (e.g., based on determining a location of the user equipment 10, such as by using GPS or GNSS coordinates of the user equipment 10) such that transmission signal quality or power of the user equipment 10 is degraded. If so, then the base station 104 and/or the network 102 may assign less resource blocks to the user equipment 10, as increasing the number of resource blocks may increase an allocated bandwidth, for which performance may suffer from a phase relationship between the same signals transmitted, which may lead to power drop, packet loss and so on.

Figure 5:
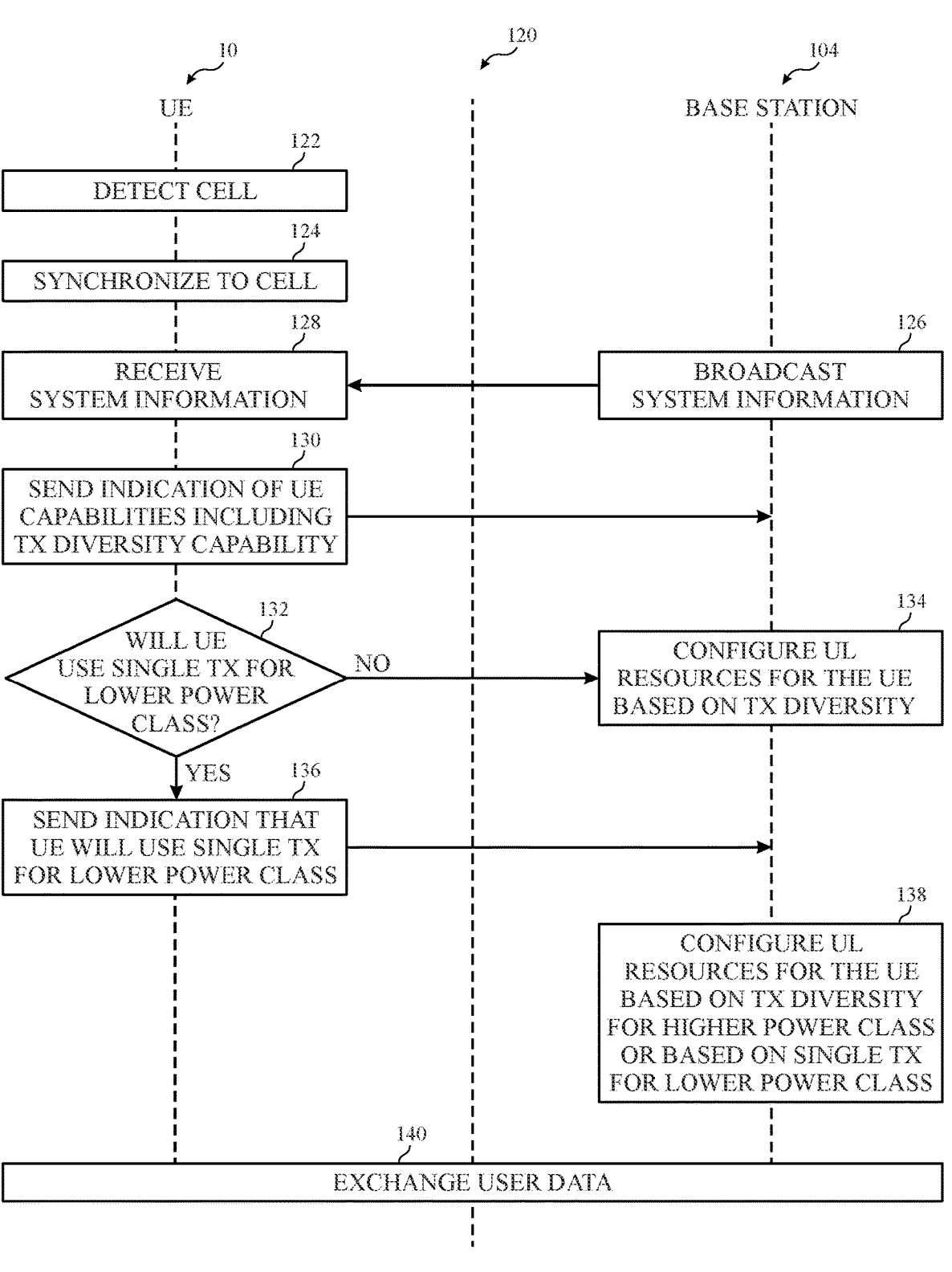
FIG. 5 is a flowchart of a method for enabling the user equipment of FIG. 1 to indicate that, when falling back to the lower power class, it may perform single transmission instead of transmission diversity, according to embodiments of the present disclosure.

FIG. 5 is a flowchart of a method 120 for enabling the user equipment 10 to indicate that, when falling back to the lower power class, it may perform single transmission instead of transmission diversity, according to embodiments of the present disclosure. Any suitable device (e.g., a controller) that may control components of the user equipment 10, the base station 104, and/or the network 102, such as the processor 12, may perform the method 120. In some embodiments, the method 120 may be implemented by executing instructions stored in a tangible, non-transitory, computer-readable medium, such as the memory 14 or storage 16, using the processor 12. For example, the method 120 may be performed at least in part by one or more software components, such as an operating system of the user equipment 10, the base station 104, and/or the network 102, one or more software applications of the user equipment 10, the base station 104, and/or the network 102, and the like. While the method 120 is described using steps in a specific sequence, it should be understood that the present disclosure contemplates that the described steps may be performed in different sequences than the sequence illustrated, and certain described steps may be skipped or not performed altogether. Moreover signals sent or received by the user equipment 10 or the base station 104 may be caused by the processing circuitry 12 of the user equipment 10 or the base station 104 causing the transmitter 52 of the user equipment 10 or the base station 104 to send the signals and the receiver 54 of the user equipment 10 or the base station 104 to receive the signals, respectively.

At process block 122, the user equipment 10 detects the base station 104 (e.g., a cell of the base station 104). In particular, the user equipment 10 may detect the base station 104 by receiving a radio frequency (RF) signal when the user equipment 10 enters a coverage area of the base station 104 (e.g., a geographical region for which the base station 104 provides network coverage). The RF signal may include timing alignment information, among other information. At process block 124, the user equipment 10 synchronizes to the base station 104 (e.g., the cell of base station 104) by aligning its timing with the timing alignment information of the base station 104.

At process block 126, the base station 104 broadcasts or transmits system information indicative of frequency bands supported by the base station 104. At process block 128, the user equipment 10 reads the system information, including the indications of the frequency bands, received from the base station 104. The system information may additionally include timing specification, power specifications, Global Positioning System (GPS) or Global Navigation Satellite System (GNSS) coordinates, and/or any other suitable information to enable the user equipment 10 to establish communication with the base station 104. In some embodiments, the user equipment 10 may store the system information in the memory 14 for future usage.

At process block 130, the user equipment 10 transmits an indication of its capabilities, including whether it is capable of performing transmission diversity, to the base station 104. In particular, the user equipment 10 may indicate, for each frequency band indicated by the base station 104 in system information received in process block 128, a power class (e.g., a highest power class) the user equipment 10 may support, and whether it may perform transmission diversity or that frequency band and that power class. For example, for a first frequency band indicated in the system information, the user equipment 10 may transmit an indication of PC1.5 (e.g., the highest power class it may use on the first frequency band) and that it may perform transmission diversity for PC1.5 on the first frequency band, and, for a second frequency band indicated in the system information, the user equipment 10 may transmit an indication of PC2 (e.g., the highest power class it may use on the second frequency band) and that it may not perform transmission diversity for PC2 on the second frequency band.

At decision block 132, the user equipment 10 determines whether it will use single transmission for a lower power class than that indicated in process block 130. In particular, the user equipment 10 may determine whether, for each frequency band indicated by the base station 104 in system information received in process block 128, if assigned a lower power class than the power class it indicated it was capable of supporting to the base station 104, the user equipment 10 will switch to performing single transmission. If not, the user equipment 10 may not send an indication that it will continue performing transmission diversity to the base station 104, as the base station 104 may assume that the user equipment 10 may continue performing transmission diversity. In alternative embodiments, the user equipment 10 may send an indication that it will continue performing transmission diversity for the lower power class. In process block 134, the base station 104, upon receiving no indication that the user equipment 10 will switch to performing single transmission when assigned the lower power class, configures uplink resources (e.g., modulation order, signal power, resource blocks, timing, and so on) based on the user equipment 10 performing transmission diversity. In particular, the base station 104 may send the configuration of the uplink resources to the user equipment 10, which may apply the configuration for communication with the base station 104.

However, if the user equipment 10 determines that it will use single transmission for the lower power class, then, in process block 136, the user equipment 10 transmits an indication to that effect. The indication may include, as previously discussed, setting a bit in a modified MPR field associated with transmission diversity according to the 3GPP specification to a predefined value (e.g., a high value or '1'). In additional or alternative embodiments, the user equipment 10 may use different signaling to indicate that it will use single transmission for the lower power class. In process block 138, the base station 104, upon receiving the indication that the user equipment 10 will switch to performing single transmission when assigned the lower power class, configures uplink resources (e.g., modulation order, signal power, resource blocks, timing, and so on) based on the user equipment 10 performing transmission diversity if assigning the higher power class to the user equipment 10, or based on the user equipment 10 performing single transmission if assigning the lower power class to the user equipment 10. In particular, the base station 104 may send the configuration of the uplink resources to the user equipment 10, which may apply the configuration for communication with the base station 104.

At process block 140, the base station 104 and the user equipment 10 exchange user data using the configuration applied by the base station 104 in process block 134 or 138. The user data may include any data, such as payload data, that the user equipment 10 transmits intended for a desired destination device, and/or receives from an originating device. In this manner, the method 120 enables the user equipment 10 to indicate that, when falling back to the lower power class, it may perform single transmission instead of transmission diversity.

As an example, pursuant to process blocks 122-128, user equipment 10 may camp on or detect a cell and frequency band for which it supports PC1.5 (having a maximum transmission power of 29 dBm). The frequency band may, for example, include the n77 or 3.7 gigahertz (GHz) frequency band as defined by the NR specification. Per process block 130, the user equipment 10 may indicate that it may perform transmission diversity when supporting PC1.5 on this frequency band. Per decision block 132 and process block 136, the user equipment 10 may also indicate (e.g., via a modified MPR bit or different signaling) that it will use single transmission if a lower power class is applied by the base station 104. Per process block 138, the base station 104 may indicate to the user equipment 10 that it is to use a maximum transmission power or Pmax of 26 dBm (e.g., indicative of a lower power class (PC2) than PC1.5), and, due to the indication that the user equipment 10 will use single transmission under such circumstances, configure the user equipment 10 for uplink resources based on single transmission. Such uplink resources may include higher modulation order, more allocated resource blocks, less allocated resource blocks if the base station 104 determines that the user equipment 10 is located on a cell edge, and so on, when compared to those configured for transmission diversity. Per process block 140, the user equipment 10 may apply the PC2 requirements, use single transmission, and apply PC2 MPR for single transmission (e.g., of user data) to the base station 104). Use of single transmission may result in better uplink performance compared to using transmission diversity. Additionally, using PC2 MPR for single transmission instead of PC2 MPR for transmission diversity may further increase uplink performance. In particular, the base station 104 may allocate uplink resources that may be further improved due to the superior MPR of PC2 MPR for single transmission compared to PC2 MPR for transmission diversity.

As another example, user equipment 10 may perform transmission diversity to achieve PC2 (having a maximum transmission power of 26 dBm) with two PC3 amplifiers 66 (each having a maximum transmission power of 23 dBm). Pursuant to process blocks 122-128, the user equipment 10 may camp on or detect a cell and frequency band for which it supports PC2 with transmission diversity. The frequency band may, for example, include the n41 or 2.5 GHz frequency band as defined by the NR specification. Per process block 130, the user equipment 10 may indicate that it may perform transmission diversity when supporting PC2 on this frequency band. Per decision block 132 and process block 136, the user equipment 10 may also indicate (e.g., via a modified MPR bit or different signaling) that it will use single transmission if a lower power class is applied by the base station 104. Per process block 138, the base station 104 may configured the user equipment 10 with a percentage of uplink symbols that is greater than 50%, or such that network signals have a maximum transmission power or Pmax of 23 dBm (e.g., both parameters indicative a lower power class (PC3) than P2), and, due to the indication that the user equipment 10 will use single transmission under such circumstances, configure the user equipment 10 for uplink resources based on single transmission. Per process block 140, the user equipment 10 may apply the PC3 requirements, use single transmission, and apply PC3 MPR for single transmission (e.g., of user data) to the base station 104). Use of single transmission may result in better uplink performance compared to using transmission diversity. Additionally, using PC2 MPR for single transmission instead of PC2 MPR for transmission diversity may further increase uplink performance. In particular, the base station 104 may allocate uplink resources that may be further improved due to the superior MPR of PC2 MPR for single transmission compared to PC2 MPR for transmission diversity.

As discussed above, transmission diversity is a transparent user equipment 10 capability. That is, even when indicating that it is capable of performing to the network 102, the user equipment 10 may switch off one transmitter (e.g., 52A) or transmitter chain and transmit with another transmitter (e.g., 52B) or transmitter chain. In such a case where the user equipment 10 decides to transmit with single transmission and not using transmission diversity, the network 102 may be unaware without practicing the disclosed embodiments. In particular, use of single transmission may be desirable if the user equipment 10 transmission power falls below a threshold power level in order to decrease power consumption.

Accordingly, in some embodiments, user equipment 10 signaling to the base station 104 may be implemented that enables indicating to the base station 104 that the user equipment 10 may perform single transmission and stop performing transmission diversity at a threshold power level. In particular, the user equipment 10 determines power headroom (PHR), and regularly or periodically reports the PHR to the base station 104. The PHR may be defined as a different between the maximum transmission power of the user equipment 10 and an uplink (UL) power, as shown in Equation 1 below.

$$PHR = UE\ maximum\ power - UL\ power \qquad \text{Equation 1}$$

Figure 6:
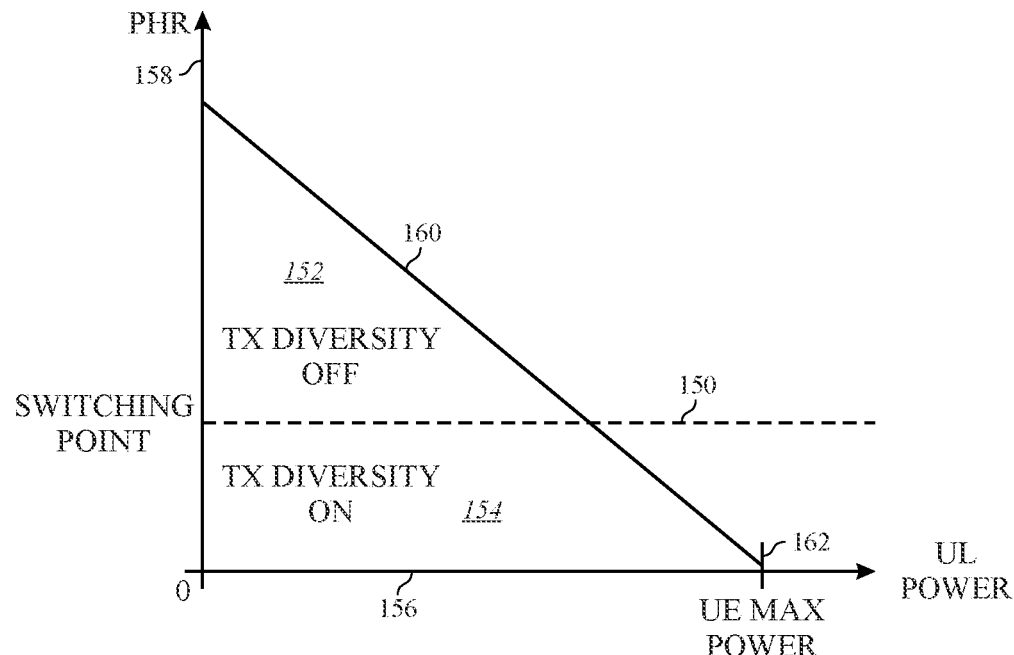
FIG. 6 is a plot illustrating a power headroom (PHR) threshold for which the user equipment of FIG. 1 may switch between a single transmission mode and a transmission diversity mode, according to embodiments of the present disclosure.

As such, the user equipment 10 may indicate a PHR threshold for which, when the PHR is above the threshold, single transmission may be performed, and, when the PHR is below the threshold, transmission diversity may be performed. FIG. 6 is a plot illustrating a PHR threshold 150 (e.g., a switching point) for which the user equipment 10 may switch between a single transmission mode 152 and a transmission diversity mode 154, according to embodiments of the present disclosure. The plot includes a horizontal or x-axis 156 representing uplink power, and a vertical or y-axis 158 representing PHR. An inverse relationship 160 between uplink (e.g., transmission) power and PHR is plotted, where, as uplink power increases, PHR decreases, and vice versa. Indeed, where the uplink power is maximum 162 (e.g., at user equipment (UE) 10 maximum power or Pmax), the PHR is at a minimum (e.g., 0 dB). As illustrated, when the PHR is above the threshold 150, the user equipment 10 may operate in the single transmission mode 152 (e.g., such that the transmission diversity mode 154 is off), and when the PHR is below (or equal to) the threshold 150, the user equipment 10 may operate in the transmission diversity mode 154. The threshold may be any suitable PHR for which a transition between the single transmission mode 152 and the transmission diversity mode 154 may occur, such as between 1 dB and 10 dB, between 3 dB and 6 dB, and so on.

Figure 7:
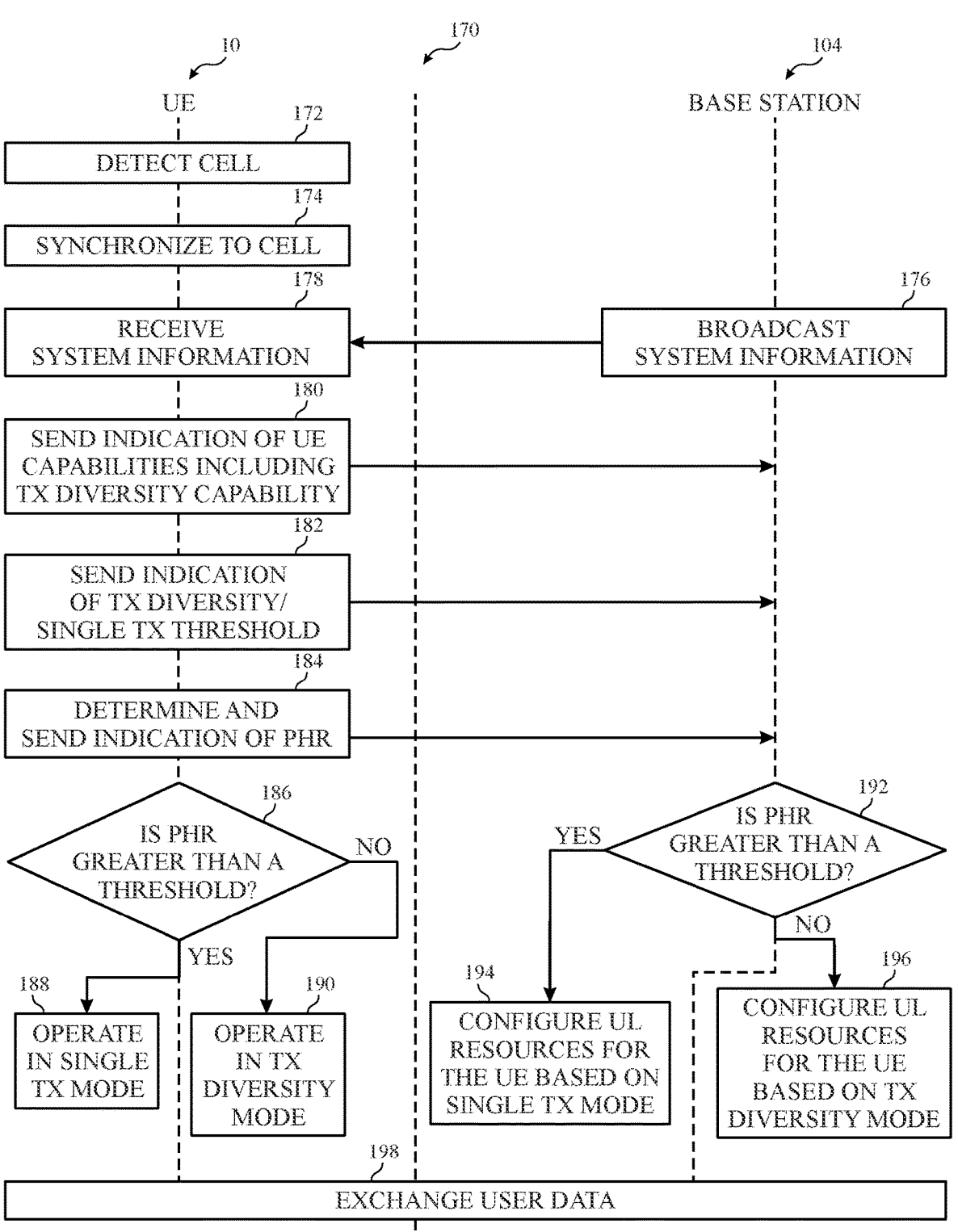
FIG. 7 is a flowchart of a method for enabling the user equipment of FIG. 1 and the base station of FIG. 4 to determine when the user equipment is performing single transmission or transmission diversity based on the PHR threshold of FIG. 6, according to embodiments of the present disclosure.

FIG. 7 is a flowchart of a method 170 for enabling the user equipment 10 and the base station 104 to determine when the user equipment 10 is performing single transmission or transmission diversity based on a PHR threshold, according to embodiments of the present disclosure. Any suitable device (e.g., a controller) that may control components of the user equipment 10, the base station 104, and/or the network 102, such as the processor 12, may perform the method 170. In some embodiments, the method 170 may be implemented by executing instructions stored in a tangible, non-transitory, computer-readable medium, such as the memory 14 or storage 16, using the processor 12. For example, the method 170 may be performed at least in part by one or more software components, such as an operating system of the user equipment 10, the base station 104, and/or the network 102, one or more software applications of the user equipment 10, the base station 104, and/or the network 102, and the like. While the method 170 is described using steps in a specific sequence, it should be understood that the present disclosure contemplates that the described steps may be performed in different sequences than the sequence illustrated, and certain described steps may be skipped or not performed altogether. Moreover signals sent or received by the user equipment 10 or the base station 104 may be caused by the processing circuitry 12 of the user equipment 10 or the base station 104 causing the transmitter 52 of the user equipment 10 or the base station 104 to send the signals and the receiver 54 of the user equipment 10 or the base station 104 to receive the signals, respectively.

At process block 172, the user equipment 10 detects the base station 104, similar to process block 122 described above with respect to FIG. 5. At process block 174, the user equipment 10 synchronizes to the base station 104, similar to process block 124 described above with respect to FIG. 5. At process block 176, the base station 104 broadcasts system information indicative of frequency bands supported by the base station 104, similar to process block 126 described above with respect to FIG. 5. At process block 178, the user equipment 10 reads the system information, including the indications of the frequency bands, received from the base station 104, similar to process block 128 described above with respect to FIG. 5. At process block 180, the user equipment 10 transmits an indication of its capabilities, including whether it is capable of performing transmission diversity, to the base station 104, similar to process block 130 described above with respect to FIG. 5.

At process block 182, the user equipment 10 transmits an indication of its PHR threshold 150 to the base station 104. In particular, the PHR threshold 150 may provide a switching point for which, when the PHR of the user equipment 10 is above the threshold 150, single transmission may be performed, and, when the PHR is below or equal to the threshold 150, transmission diversity may be performed. At process block 184, the user equipment 10 may determine its PHR (e.g., using Equation 1 above) and transmit an indication of the PHR to the base station 104. Per the 3GPP specification, the user equipment 10 may regularly or periodically determine its PHR and send an indication of the PHR to the base station 104.

At decision block 186, the user equipment 10 determines whether the PHR is greater than the PHR threshold 150. If so, then in process block 188, the user equipment 10 operates in the single transmission mode 152. If not, then in process block 190, the user equipment 10 operates in the transmission diversity mode 154. Similarly, at decision block 192, the base station 104 determines whether the PHR is greater than the PHR threshold 150 (which may have been received from the user equipment 10 per process block 184). If so, then in process block 194, the base station 104 configures uplink resources for the user equipment 10 based on the single transmission mode 152. If not, then in process block 196, the base station 104 configures uplink resources for the user equipment 10 based on the transmission diversity mode 154. In particular, the base station 104 may send the configuration of the uplink resources to the user equipment 10, which may apply the configuration for communication with the base station 104.

At process block 198, the base station 104 and the user equipment 10 exchange user data using the configuration applied by the base station 104 in process block 194 or 196. As illustrated, the method 170 may then be repeated for updated PHRs, by returning to process block 184. In this manner, the method 170 enables the user equipment 10 and the base station 104 to determine when the user equipment 10 is performing single transmission or transmission diversity based on a PHR threshold, and allocates uplink resources accordingly. Advantageously, the method 170 may not rely on power classes, compared to the method 120 of FIG. 5, which may, at least in some respects, make the method 170 simpler to implement.

Figure 8A:
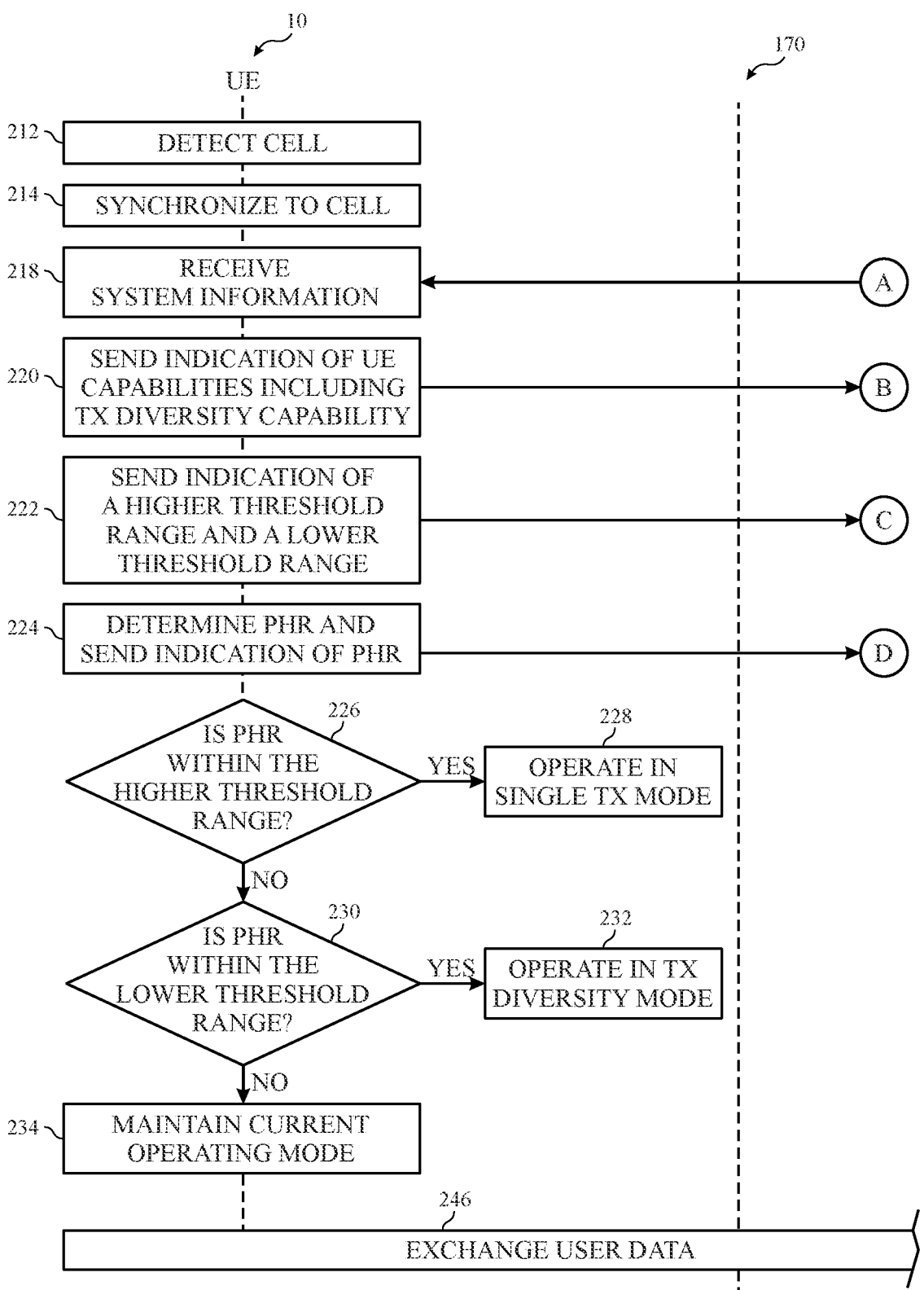
FIGS. 8A and 8B are a flowchart of a method for enabling the user equipment of FIG. 1 and the base station of FIG. 4 to determine when the user equipment is performing single transmission or transmission diversity based on PHR threshold ranges, according to embodiments of the present disclosure.
Figure 8B:
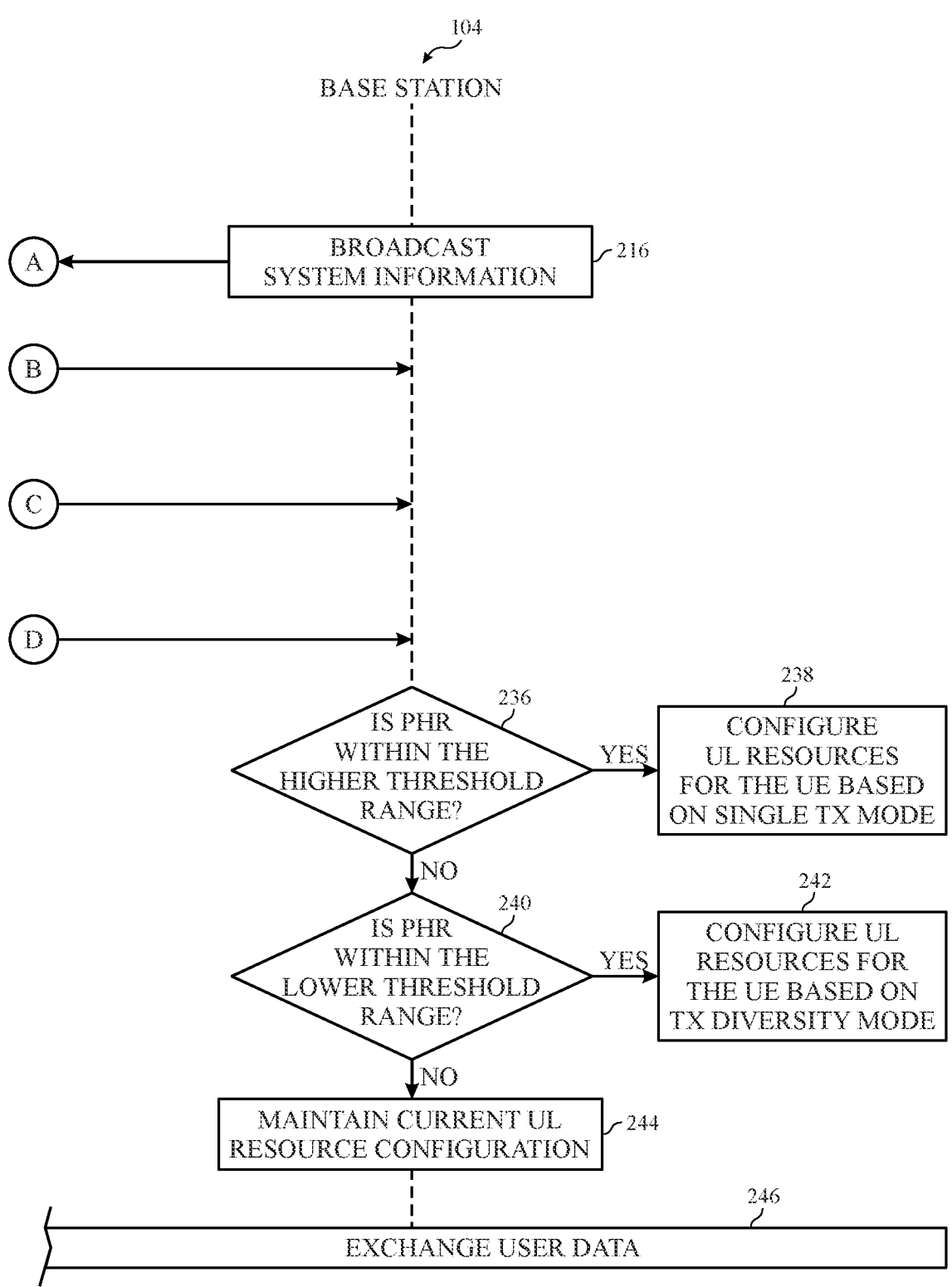

FIGS. 8A and 8B are a flowchart of a method 210 for enabling the user equipment 10 and the base station 104 to determine when the user equipment 10 is performing single transmission or transmission diversity based on PHR threshold ranges, according to embodiments of the present disclosure. Any suitable device (e.g., a controller) that may control components of the user equipment 10, the base station 104, and/or the network 102, such as the processor 12, may perform the method 210. In some embodiments, the method 210 may be implemented by executing instructions stored in a tangible, non-transitory, computer-readable medium, such as the memory 14 or storage 16, using the processor 12. For example, the method 210 may be performed at least in part by one or more software components, such as an operating system of the user equipment 10, the base station 104, and/or the network 102, one or more software applications of the user equipment 10, the base station 104, and/or the network 102, and the like. While the method 210 is described using steps in a specific sequence, it should be understood that the present disclosure contemplates that the described steps may be performed in different sequences than the sequence illustrated, and certain described steps may be skipped or not performed altogether. Moreover signals sent or received by the user equipment 10 or the base station 104 may be caused by the processing circuitry 12 of the user equipment 10 or the base station 104 causing the transmitter 52 of the user equipment 10 or the base station 104 to send the signals and the receiver 54 of the user equipment 10 or the base station 104 to receive the signals, respectively.

At process block 212, the user equipment 10 detects the base station 104, similar to process block 122 described above with respect to FIG. 5. At process block 214, the user equipment 10 synchronizes to the base station 104, similar to process block 124 described above with respect to FIG. 5. At process block 216, the base station 104 broadcasts system information indicative of frequency bands supported by the base station 104, similar to process block 126 described above with respect to FIG. 5. At process block 218, the user equipment 10 reads the system information, including the indications of the frequency bands, received from the base station 104, similar to process block 128 described above with respect to FIG. 5. At process block 220, the user equipment 10 transmits an indication of its capabilities, including whether it is capable of performing transmission diversity, to the base station 104, similar to process block 130 described above with respect to FIG. 5.

At process block 222, the user equipment 10 transmits an indication of a higher PHR threshold range and a lower PHR threshold range to the base station 104. In particular, the higher PHR threshold range may correspond to when single transmission may be performed, and the lower PHR threshold range may correspond to when transmission diversity may be performed. In between the two ranges (e.g., in a middle range), the user equipment 10 may maintain its transmission mode (e.g., either the single transmission mode 152 or the transmission diversity mode 154). At process block 224, the user equipment 10 may determine its PHR (e.g., using Equation 1 above) and transmit an indication of the PHR to the base station 104. Per the 3GPP specification, the user equipment 10 may regularly or periodically determine its PHR and send an indication of the PHR to the base station 104.

At decision block 226, the user equipment 10 determines whether the PHR is within the higher threshold range. If so, then in process block 228, the user equipment 10 operates in the single transmission mode 152. If not, then in decision block 230, the user equipment 10 determines whether the PHR is within the lower threshold range. If so, then in process block 232, the user equipment 10 operates in the transmission diversity mode 154. If not, then in process block 234, the user equipment 10 maintain its current operating mode (e.g., either the single transmission mode 152 or the transmission diversity mode 154). Similarly, at decision block 236, the base station 104 determines whether the PHR is within the higher threshold range (which may have been received from the user equipment 10 per process block 222). If so, then in process block 238, the base station 104 configures uplink resources for the user equipment 10 based on the single transmission mode 152. If not, then in decision block 240, the base station 104 determines whether the PHR is within the lower threshold range (which may have been received from the user equipment 10 per process block 222). If so, then in process block 242, the base station 104 configures uplink resources for the user equipment 10 based on the transmission diversity mode 154. If not, then in process block 244, the base station 104 maintain the user equipment's 10 current uplink resource configuration (e.g., for either the single transmission mode 152 or the transmission diversity mode 154). In particular, the base station 104 may send the configuration of the uplink resources to the user equipment 10, which may apply the configuration for communication with the base station 104.

At process block 246, the base station 104 and the user equipment 10 exchange user data using the configuration applied by the base station 104 in process block 238, 242, or 244. As illustrated, the method 210 may then be repeated for updated PHRs, by returning to process block 224. In this manner, the method 210 enables the user equipment 10 and the base station 104 to determine when the user equipment 10 is performing single transmission or transmission diversity based on PHR threshold ranges, and allocates uplink resources accordingly. As with the method 170 of FIG. 7, the method 210 may not rely on power classes, compared to the method 120 of FIG. 5, which may, at least in some respects, make the method 210 simpler to implement.

In additional or alternative embodiments, a hysteresis-like approach may be implemented to prevent constant or repeated toggling of transmission diversity if the PHR hovers near the threshold. For example, the user equipment 10 may switch off transmission diversity if the PHR is greater than 6 dB as it is well into a power backoff range that transmission diversity may not be needed to achieve current output power. As another example, if the PHR is within a first (e.g., higher) threshold range, then the user equipment 10 may perform single transmission. If the PHR is within a second (e.g., lower) threshold range, then the user equipment 10 may perform transmission diversity. Otherwise, if the PHR is within a third (e.g., middle) threshold range between the first and second threshold ranges, the user equipment 10 may maintain its transmission mode (e.g., either the single transmission mode or the transmission diversity mode).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
causing, by processing circuitry of user equipment, a transmitter of the user equipment to transmit an indication of a capability of operating in a transmission diversity mode of the user equipment for a first power class to a base station;
setting, by the processing circuitry, a value of a maximum power reduction field based on operating in a single transmission mode for a second power class;
causing, by the processing circuitry, the transmitter to transmit an indication of operating in the single transmission mode and for the second power class to the base station, the indication comprising the maximum power reduction field;
causing, by the processing circuitry, a receiver of the user equipment to receive uplink resources from the base station based on the transmitter operating in the single transmission mode for the second power class; and
causing, by the processing circuitry, the transmitter to operate in the single transmission mode using the uplink resources.

2. The method of claim 1, wherein the first power class is a higher power class than the second power class.

3. The method of claim 1, comprising causing, by the processing circuitry, the receiver to receive system information from the base station, the system information comprising at least one frequency band.

4. The method of claim 3, wherein the capability of operating in the transmission diversity mode of the user equipment for the first power class is based on the at least one frequency band.

5. The method of claim 1, comprising causing, by the processing circuitry, the receiver to receive additional uplink resources from the base station based on the transmitter using the transmission diversity mode for the first power class, and causing, by the processing circuitry, the transmitter to operate in the transmission diversity mode using the additional uplink resources.

6. The method of claim 5, wherein the uplink resources are greater than the additional uplink resources.

7. The method of claim 5, wherein the uplink resources comprise higher modulation order, increased signal power, or more resource blocks, or any combination thereof, compared to the additional uplink resources.

8. The method of claim 1, wherein the first power class comprises power class 1.5 and the second power class comprises power class 2 according to the Third Generation Partnership Project (3GPP), or the first power class comprises power class 2 and the second power class comprises power class 3 according to the 3GPP.

9. A base station, comprising:
a transmitter;
a receiver; and
processing circuitry configured to:

cause the transmitter to transmit system information comprising at least one frequency band, cause the receiver to receive an indication that user equipment will use single transmission for a first power class on the at least one frequency band from the user equipment, and configure the user equipment with first uplink resources based on the user equipment using single transmission for the first power class on the at least one frequency band, or configure the user equipment with second uplink resources based on the user equipment using transmission diversity for a second power class on the at least one frequency band, the first uplink resources being greater than the second uplink resources.

10. The base station of claim 9, wherein the first power class comprises a lower maximum transmission power than the second power class.

11. The base station of claim 9, wherein the first power class comprises power class 2 and the second power class comprises power class 1.5 according to the Third Generation Partnership Project (3GPP), or the first power class comprises power class 3 and the second power class comprises power class 2 according to the 3GPP.

12. The base station of claim 9, wherein the processing circuitry is configured to cause the receiver to receive an indication of a maximum power reduction for the first power class from the user equipment.

13. The base station of claim 12, wherein the processing circuitry is configured to configure the user equipment with the first uplink resources when the maximum power reduction comprises a standard maximum power reduction associated with the first power class compared to when the maximum power reduction comprises a transmission diversity maximum power reduction associated with the first power class.

14. The base station of claim 9, wherein the processing circuitry is configured to cause the receiver to determine a signal quality or power associated with the user equipment, the first uplink resources comprising decreased resource blocks based on the signal quality or power being less than or equal to a threshold compared to when the signal quality or power is greater than the threshold.

15. The base station of claim 9, wherein the base station comprises a Next Generation NodeB base station.

16. The base station of claim 9, wherein the first power class is a lower power class than the second power class.

17. One or more tangible, non-transitory, computer-readable media, storing instructions configured to cause processing circuitry of user equipment to:

cause a transmitter of the user equipment to transmit an indication of a threshold power headroom associated with transitioning between operating in a single transmission mode and operating in a transmission diversity mode to a base station;

cause the transmitter to transmit an indication of a power headroom of the transmitter to the base station;

cause a receiver of the user equipment to receive an indication of uplink resources allocated by the base station based on the power headroom of the transmitter and whether the user equipment operates in the single transmission mode or the transmission diversity mode; and cause the transmitter to operate in the single transmission mode or the transmission diversity mode based on the power headroom.

18. The one or more tangible, non-transitory, computer-readable media of claim 17, wherein the uplink resources allocated by the base station are greater when the power headroom is greater than the threshold power headroom than when the power headroom is less than or equal to the threshold power headroom.

19. The one or more tangible, non-transitory, computer-readable media of claim 17, wherein the instructions are configured to cause the processing circuitry to operate in the single transmission mode when the power headroom is greater than the threshold power headroom.

20. The one or more tangible, non-transitory, computer-readable media of claim 17, wherein the instructions are configured to cause the processing circuitry to cause the transmitter to operate in the transmission diversity mode when the power headroom is less than or equal to the threshold power headroom.

* * * * *